3,203,918
BETA HYDROXYALKYL ACRYLATE/VINYL
ALCOHOL COPOLYMERS
Albert I. Goldberg, Berkeley Heights, and Victor Jasinski, North Plainfield, N.J., assignors to National Starch and Chemical Corporation, New York, N.Y., a corporation of Delaware
No Drawing. Filed Jan. 17, 1962, Ser. No. 168,306
10 Claims. (Cl. 260—29.6)

This invention relates to a process of preparing novel copolymers of vinyl alcohol and beta-hydroxyalkyl acrylates and to the copolymers produced thereby. More particularly, this invention relates to vinyl alcohol-beta hydroxyalkyl acrylate copolymers which are especially useful for the preparation of films and coatings.

It is an object of this invention to obtain films and coatings from vinyl alcohol-beta hydroxyalkyl acrylate copolymers, said films and coatings being characterized by their ability to remain soft and flexible in the absence of plasticizers. A further object of this invention involves the preparation of vinyl alcohol-beta hydroxyalkyl acrylate copolymers wherein the components of the composition may be varied so as to yield films and coatings which may be either water insoluble or readily water soluble. Various other objects and advantages of this invention will be apparent from the description hereinafter presented.

As is known in the art, polyvinyl alcohol is a synthetic resin prepared by the alcoholysis of polyvinyl acetate. It is a tough, water soluble polymer with excellent film forming properties. Unfortunately, the applications for polyvinyl alcohol films and coatings are somewhat limited since such films display a pronounced tendency toward brittleness which is especially evident at low temperatures and low humidities. In order to overcome this detrimental tendency and thereby produce soft, flexible films and coatings, it has been necessary to formulate polyvinyl alcohol with water soluble plasticizers such as glycerine or triethylene glycol. The use of these extraneous plasticizers has, in turn, led to other problems including a reduction in the tensile strength and the tear and abrasion resistance of the resulting plasticized films. In addition, these plasticizers tend to migrate from the film and thus must be present in a high initial concentration in order to provide films with a prolonged freedom from brittleness. However, as the amount of plasticizer is increased, the films become soft, mushy and progressively weaker, the exudation of plasticizer becomes quite severe and blocking and moisture sensitivity increases markedly.

Another useful property of polyvinyl alcohol is its ability to be cross-linked and thereby rendered water insoluble. Such cross-linking may be effected by treating the polyvinyl alcohol polymer with a variety of cross-linking agents such as aldehydes and heavy metal salts. Heating or prolonged aging in the presence of acids also serves to cross-link the polymer. Although this ability to be readily cross-linked and insolubilized is useful and advantageous for many applications, there are other instances wherein it is often desirable to retain the original water solubility of the polymer. For example, detergent pouches prepared from polyvinyl alcohol film would obviously be rendered useless if they were to become extensively cross-linked.

We have discovered that copolymers of vinyl alcohol and beta-hydroxyalkyl acrylates (hydroxyalkyl acrylates) provide soft, flexible films and coatings without the need of a plasticizer. Moreover, by selection of the appropriate beta-hydroxyalkyl acrylate, copolymers which may be insolubilized by cross-linking, or copolymers which are characterized by a permanent retention of their water solubility may be produced.

The novel copolymers of our invention are copolymers of vinyl alcohol and beta-hydroxyalkyl acrylate esters wherein the alkyl group of said beta-hydroxyalkyl acrylate esters may contain from 2–4 carbon atoms. Such copolymers are readily prepared, as will be hereinafter described by the polymerization and subsequent alcoholysis of copolymers of vinyl acetate and beta-hydroxyalkyl acrylate esters.

Illustrative of the beta-hydroxyalkyl acrylates coming within the scope of our invention are hydroxyethyl acrylate, beta-hydroxypropyl acrylate, and beta-hydroxybutyl acrylate. The overall composition of our copolymers may range from about 90–10 mole percent of any one, or more, of the above-listed hydroxyalkyl acrylate esters, together with from 10–90 mole percent of vinyl alcohol.

Furthermore, mixtures of hydroxyalkyl acrylates may be used provided that their combined amount does not exceed the above-enumerated mole percent concentrations. However, the respective concentration of hydroxyethyl acrylate in combination with hydroxypropyl or hydroxybutyl acrylate or vice versa must be considered from the standpoint of the water solubility desired. This factor is discussed further hereafter.

Minor quantities, comprising up to 5 mole percent, of one or more comonomers, such as, crotonic acid or crotonic acid esters may also be present in the final product.

It has been found in the preparation of copolymers of vinyl acetate and hydroxyalkyl acrylates, particularly in the case where the mole percent concentration of hydroxyalkyl acrylate is less than 50 that the preparation of a homogeneous copolymer of vinyl acetate and beta-hydroxyalkyl acrylate is greatly facilitated by the presence of up to 5 mole percent of crotonic acid, crotonic acid esters or derivatives thereof in the polymer, said polymer being a terpolymer of vinyl acetate, hydroxyalkyl acrylate and crotonic acid or derivatives thereof. Crotonic acid esters that are suitable are alkyl esters wherein the alkyl group contains from one to eight carbon atoms and beta-hydroxyalkyl esters wherein the alkyl group contains from two to four carbon atoms. This improvement is the subject of a separate application, Serial No. 173,852, filed January 25, 1962, and assigned to the assignee of the subject application, said application hereby being incorporated into and forming a part of the disclosure of the subject application.

The polymerization of the vinyl acetate:hydroxyalkyl acrylate or vinyl acetate:hydroxyalkyl acrylate:crotonic acid copolymers, which are subsequently alcoholyzed to form the vinyl alcohol copolymers of our invention, may be conducted by means of solution polymerization techniques well known to those skilled in the art. Ordinarily, the techniques involve the heating, under reflux, of about a 40–75%, by weight, organic solvent solution of the respective monomers in the presence of a free radical initiating catalyst. It is possible to utilize any solvent in which the monomers and the ultimate copolymers are soluble. Such solvents include acetone, methyl ethyl ketone, ethyl acetate and various alcohols. In practice, however, the use of alcohols, and particularly methanol or ethanol, is preferred since the resulting copolymer solutions may then be directly utilized for the alcoholysis step without the need for separating the copolymer and redissolving it in an alcohol as would be necessitated in those cases wherein the polymerization was conducted in a non-alcoholic solvent.

Examples of catalysts useful for the polymerization are organic peroxides, such as benzoyl peroxide, or azo compounds such as azodiisobutyronitrile. These catalysts may be present in a concentration which may range from about 0.1–3.0%, as based upon the total weight of the monomer charge. The polymerization temperature will depend upon the solvent used and on whether the polymerization is conducted at reflux, under pressure or vacuum; and, it will thus vary within the order of from about 50–80° C. Optimum results have been obtained by utilizing a so called "slow addition" technique wherein the hydroxyalkyl acrylate ester is slowly added in small portions during the course of the polymerization, thereby further facilitating the formation of completely homogeneous copolymers.

The alcoholysis of the resulting copolymers is accomplished by reacting a methanol or ethanol solution of the copolymer and a small amount of alcoholic potassium hydoxide. Although the use of the latter reagent is preferred, operable equivalents include alcoholic sodium hydroxide, sodium methoxide, sodium ethoxide and other comparable alcoholic bases. In any event, the resulting alcoholic solution of the vinyl acetate copolymer should have a final resin solids content of about 15–40%, by weight. The concentration of alcoholic potassium hydroxide which is to be used may be readily determined by the practitioner and should be a quantity which will selectively and completely alcoholyze the acetate groups of the copolymer or a major portion thereof, without attacking the acrylate groups. In most cases, however, the concentration of the alcoholic potassium hydroxide will vary between about 3 to 20%, as based upon the total weight of copolymer resin solids.

To accelerate the alcoholysis reaction, the charge may be heated to its reflux temperature and maintained at this level for about half an hour. Depending upon the concentration of the hydroxyalkyl acrylate ester in the copolymer, the alcoholyzed product either precipitates out, remains suspended, or is completely soluble in the reaction medium. Generally, in these alcoholysis reactions, as the mole percent concentration of the beta-hydroxyalkyl acrylate is increased, the solubility of the polymeric reaction product is increased.

The final step involved in the preparation of our vinyl alcohol copolymers involves their conversion into the form of an aqueous solution. Aqueous solutions are preferred since the hazards involved in the handling of organic solvents are thereby avoided. In accomplishing this transformation several procedures may be followed. The copolymer may be separated by precipitation, filtered off and then dissolved in water; or, water may be added to the alcohol solution and the residual alcohol and by-product acetate ester removed by distillation. The latter is the preferred procedure since it is the more direct separation technique. The final resin solids content of aqueous copolymer solutions should be in the range of about 10–40% by weight.

The copolymers of our invention may, at times, retain some unalcoholyzed acetate groups. The presence of such groups in an amount not exceeding 5 mole percent of the final product have not adversely affected the polymer product.

In all cases, the films and coatings derived from the vinyl alcohol:hydroxyalkyl acrylate or vinyl alcohol:hydroxyalkyl acrylate:crotonic acid copolymers of our invention are found, surprisingly, to be entirely free from the undesirable brittleness which is characteristic of ordinary polyvinyl alcohol polymers. This freedom from brittleness is achieved without the need for formulation with extraneous plasticizers and is, moreover, maintained at low temperatures and low humidities. A further feature of this invention is that the flexibility of the copolymer may be increased by increasing the concentration of the hydroxyalkyl acrylate, thereby making it possible for the practitioner to prepare copolymers tailored to the degree of flexibility desired.

As noted above, the ability to cross-link the copolymers depends upon the particular hydroxyalkyl acrylate ester which is used. Thus, where hydroxyethyl acrylate is used, the resulting copolymer will contain primary hydroxyl groups, and will cross-link either on prolonged aging; by the application of moderate heating such as, for example, about ten minutes at 130° C. and/or by addition of cross-linking agents to the copolymer. Catalysts may also be added to accelerate the cross-linking. Such cross-linking agents include aldehydes such as glyoxal, and furfural aldehyde; non-polymeric cyclic urea compounds such as dimethylol ethylene urea; non-polymeric urea-formaldehyde condensates such as dimethylol urea; non-polymeric phenol-formaldehyde condensates such as trimethylol phenol; and non-polymeric melamine-formaldehyde condensates such as trimethylol melamine. Catalysts of the acidic type including non-oxidizing inorganic acids such as phosphoric and hydrochloric acids; non-volatile organic acids such as oxalic, fumaric and para-toluene sulfonic acids; and, acidic salts such as ferric chloride, chromic nitrate, chromic chloride, chromic sulfate, ammonium chloride, aluminum chloride, zinc nitrate, cupric chromate, ammonium dichromate, and stearato chromic chloride are useful.

Depending upon the reactivity of particular cross-linking agent and the catalytic activity of the particular catalyst which is used, these materials ordinarily are added to the aqueous copolymer solutions in amounts ranging from about 0.5 to 5.0%, as based upon the weight of the copolymer resin solids.

The ease with which the vinyl alcohol:hydroxyethyl acrylate copolymers cross-link increases as the concentration of the latter monomer is increased. However, the copolymer may be cross-linked even when the hydroxyethyl acrylate ester is present at its minimum concentration of 10 mole percent. The vinyl alcohol:hydroxyethyl acrylate copolymers may thus be used in processes wherein coatings or films are to be deposited from their aqueous solutions and subsequently rendered insoluble by aging, by application of heat and/or by prior formulation with a cross-linking agent.

In contrast to the behavior of the above-described hydroxyethyl acrylate copolymers, the hydroxypropyl and hydroxybutyl acrylate copolymers do not lose their water solubility on aging or when heated, for example, under such severe conditions as for half an hour at 130° C. Moreover, this resistance to cross-linking is maintained throughout the acrylate concentration range of 10–90%. This retention of water solubility is attributed to the fact that both the hydroxypropyl and the hydroxybutyl acrylate provide the resulting copolymers with secondary hydroxyl groups rather than with primary hydroxyl groups as is the case when hydroxyethyl acrylate is used.

The use of copolymers of vinyl alcohol and hydroxypropyl or hydroxybutyl acrylate lie in applications wherein retention of good water solubility is important. These include their use in the preparation of water soluble film packets for the packaging of such items as household bleaches, detergents and other laundering aids as well as such products as insecticides, corrosive liquids and solids and highly odiferous materials.

As noted earlier, the softness and flexibility of our novel copolymers can be controlled by varying the amount of hydroxyalkyl acrylate ester which is present therein. Another method by which this may be accomplished involves a physical blending of our copolymers and a water soluble polymer of polyvinyl alcohol whereby the softness and flexibility of the compatible blend varies in accordance with the amount of polyvinyl alcohol added. This polyvinyl alcohol polymer may contain up to 20% by weight, of acetate groups. The concentration of polyvinyl alcohol which may be used for this purpose may be varied from about 20 to 80%, based upon the total weight of copolymer and polyvinyl alcohol present in the resulting blend; however, in all cases, the resulting blends should contain at least 10 mole percent of betahydroxyalkyl acrylate. Because of its excellent compatibility with our copolymers, the use of polyvinyl alcohol in amounts falling within the above-stated range is a particularly attractive method for enhancing the properties which are normally characteristic of the products of our invention as well as for increasing the utility of polyvinyl alcohol.

The actual preparation of films and coatings from the aqueous copolymer solutions of our invention may be accomplished by means of any of the usual film casting techniques known to those skilled in the art. Useful coatings of either the cross-linkable or water soluble type may be cast upon a variety of substrates including paper, wood, metal, cloth, and synthetic plastics which may be either in the form of films or solid masses. Self-supporting films of the copolymers of our invention or blends of the latter with polyvinyl alcohol may be formed by casting their aqueous solutions upon non-adherent substrates such as steel plates or upon surfaces coated with polyethylene terephthalate or polytetrafluoroethylene. After such films have dried, they may then be stripped from these non-adherent substrates, wound on a take-up spool, and stored until needed.

The following examples will further illustrate this invention. In the examples, all parts are by weight unless otherwise noted.

EXAMPLE I

This example illustrates the preparation of an aqueous solution of a vinyl alcohol:hydroxyethyl acrylate:crotonic acid copolymer having a mole percent ratio of 87:10:3.

The following ingredients were added to a reaction vessel equipped with means for mechanical agitation, a water cooled condenser, a thermometer, and a slow addition funnel.

| | |
|---|---|
| Vinyl acetate | 89.0 |
| Crotonic acid | 3.0 |
| Methanol | 60.0 |
| Benzoyl peroxide | 0.9 |

The above charge was stirred and brought to reflux at 60° C. by heating on a water bath. The slow addition of 13 parts of hydroxyethyl acrylate was then initiated and continued, at a uniform rate, over a period of 3 hours. Reflux was maintained for an additional 6 hours whereupon another 100 parts of methanol were added and any residual, unreacted vinyl acetate monomer was then removed by azeotropic distillation. The distillation was continued until 100 parts of azeotrope were collected and the lacquer was next cooled to room temperature and finally diluted to a solids content of 50%, by weight, by the addition of another 35 parts of methanol.

Three 60 gram samples, hereinafter referred to as samples A, B, and C, were then taken from this lacquer and were treated, respectively, with 20, 25, and 30 grams of a 10% by weight, methanol solution of potasisum hydroxide. To insure completion of the alcoholysis reaction, the samples were heated to 60° C. and maintained at this temperature for 30 minutes. As the alcoholysis of the copolymer proceeded, it became increasingly insoluble and soon was completely precipitated. The three samples were then isolated by filtration and were each analyzed for their hydroxyethyl acrylate content by means of a standard saponification technique.

The alcoholyzed samples, A, B, C, gave saponification numbers of 135, 95, and 80, respectively. Thus, by comparing these values with theoretical calculations, we found that sample B most closely corresponds to the desired composition, i.e., a copolymer in which the acetate groups were essentially completely hydrolyzed and the acrylate groups were left intact. On the basis of this determination, the bulk of the preparation was thereupon alcoholyzed by the above-described procedure using the same quantity of 10% alcoholic potassium hydroxide solution as was used for sample B, i.e., 25 grams per 30 grams of polymer. In this case, however, the alcoholized copolymer was not isolated but was dissolved in water and the mixture of methanol and methyl acetate removed by distillation.

The resulting vinyl alcohol:hydroxyethyl acrylate:crotonic acid copolymer was found to be completely water soluble and, with the exception of their inherent softness and flexibility, the films derived from this copolymer were comparable in most physical properties to ordinary polyvinyl alcohol films without extraneous plasticizers. In demonstrating the improved softness of the films derived from the aqueous copolymer solution of our invention, we utilize the Sward-Rocker hardness test. This method rates film hardness or softness on an arbitrary scale of from 0–100 wherein a value of 100 corresponds to a hardness equivalent to that of a glass plate while a value of 0 indicates a film which is almost tacky. Thus, the softness of films of the copolymer of Example I as determined by the Sward-Rocker method, averaged 34, as compared with a value of 48 for comparable films of polyvinyl alcohol.

EXAMPLE II

This example illustrates the preparation of additional samples of the copolymers of our invention. It also serves to demonstrate their varying cross-linking characteristics.

The following table presents the composition of ten different aqueous copolymer solutions each of which was prepared by means of the procedure described in Example I. Films from each of these copolymers, said films cast at a wet thickness of 6 mils, were prepared and their solubilities in water and methanol determined. In addition, comparable films derived from these copolymers were baked for 30 minutes at 130° C. whereupon their solubility in water was determined. The results of these solubility tests are set forth in Table I.

*Table I.—Copolymer composition*

| Copolymer No. | Mole percent vinyl alcohol | Mole percent hydroxyethyl acrylate | Mole percent hydroxypropyl acrylate | Mole percent hydroxybutyl acrylate | Mole percent crotonic acid | Solubility of unbaked film in— | | $H_2O$ solubility of baked film |
|---|---|---|---|---|---|---|---|---|
| | | | | | | $H_2O$ | $CH_3OH$ | |
| 1 | 76 | | 20 | | 4.0 | S | I | S. |
| 2 | 85 | | | 10 | 5.0 | S | I | S. |
| 3 | 72 | | | 25 | 3.0 | S | I | S. |
| 4 | 58 | | 40 | | 2.0 | S | I | S. |
| 5 | 50 | 49 | | | 1.0 | S | PS | I. |
| 6 | 45 | | 55 | | 0.0 | S | PS | S. |
| 7 | 30 | | 70 | | 0.0 | S | S | S. |
| 8 | 25 | 75 | | | 0.0 | S | S | I. |
| 9 | 10 | | 90 | | 0.0 | S | S | S. |
| 10 | 77 | 20 | | | 3.0 | S | I | I. |

S=soluble.   I=insoluble.   PS=partially soluble.

It should be observed that the baked films of those copolymers containing hydroxyethyl acrylate, i.e., Nos. 5, 8, 10, lost their water solubility while the other copolymers, which contained hydroxypropyl and hydroxybutyl acrylate, remained water soluble under these same conditions. This demonstrates that the copolymers of this invention which contain hydroxypropyl or hydroxybutyl acrylate cannot be cross-linked or insolubilized under these conditions.

EXAMPLE III

This example illustrates the preparation of one of the copolymers of this invention wherein the polymerization was conducted in a non-alcoholic solvent. In this case the product prepared was an aqueous solution of a vinyl alcohol:hydroxypropyl acrylate:crotonic acid copolymer having a mole percent ratio of 78:20:2.

The following ingredients were added to a reaction vessel equipped with means for mechanical agitation, a water cooled condenser, a thermometer, and a slow addition funnel.

| | |
|---|---|
| Vinyl acetate | 75.0 |
| Crotonic acid | 2.0 |
| Methyl acetate | 50.0 |
| Azobisisobutyronitrile | 0.4 |

The above charge was stirred and brought to reflux at 62° C. by heating on a water bath. The slow addition of 28 parts of hydroxypropyl acrylate was then initiated and was continued, at a uniform rate, over a period of 2½ hours. Reflux was maintained for an additional 6½ hours whereupon 100 parts of methanol were added and any residual, unreacted vinyl acetate monomer was removed by azeotropic distillation. The lacquer was then cooled and diluted to a resin solids content of approximately 40%, by weight, by the addition of another 90 parts of methanol. The alcoholysis reaction was conducted in precisely the same manner as described in Example I, i.e., 25 grams of 10% alcoholic potassium hydroxide per 30 grams of polymer, and the properties of the resulting aqueous solution copolymer were comparable to those described for the hydroxypropyl acrylate copolymers listed in Table I.

EXAMPLE IV

This example illustrates various film properties of the copolymers of this invention.

Table II presents the composition of seven different aqueous copolymer solutions each of which was prepared by means of the procedure described in Example I. Films from these copolymer solutions, each having been cast at a wet thickness of 6 mils, were prepared and were then heated at 130° C. for a period of 30 minutes. They were next conditioned, for 72 hours, at a temperature of 72° F. and a relative humidity of 55%.

The tensile strength in pounds per square inch (p.s.i.), and the percent elongation of these conditioned films was then measured using an Instron Tensile Tester at a crosshead speed of 2 inches per minute. The results of these tests also appear in Table II.

EXAMPLE V

This example illustrates the use of various reagents for the cross-linking of the copolymers of this invention.

An aqueous solution of a vinyl alcohol:hydroxyethyl acrylate:crotonic acid copolymer having a mole percent ratio of 72:25:3 was prepared by means of the procedure of Example I. Separate portions of this solution were then formulated with a number of different cross-linking agents.

Films having a 6 mil wet thickness were cast from each of these solutions and upon being air dried for about 24 hours at a temperature of 72° F. it was noted that these films were all effectively cross-linked as was evidenced by their complete insolubility in water. The following table lists the various cross-linking agents or catalysts used and the concentration at which they were each applied.

| Cross-linking agent or catalyst: | Concentration (percent based on resin solids) |
|---|---|
| Hydrochloric acid | 0.2 |
| Zinc nitrate | 0.3 |
| Chromic nitrate | 0.5 |
| Aluminum chloride | 1.0 |
| Ammonium chloride | 2.0 |
| Dimethylol ethylene urea* | 5.0 |
| Para-toluene sulfonic acid | 1.0 |
| Dimethylol urea* | 3.5 |
| Trimethylol phenol* | 4.0 |
| Cupric dichromate | 0.7 |
| Stearato chromic chloride | 5.0 |

* Films containing this cross-linking agent were baked at 130° C. for 30 minutes.

EXAMPLE VI

This example illustrates the preparation of formulations containing the copolymers of this invention in combination with ordinary polyvinyl alcohol. A comparison is also offered on the properties of the films derived from these blends as against the properties of films prepared from both an externally plasticized polyvinyl alcohol and an unplasticized polyvinyl alcohol.

An aqueous solution of a vinyl alcohol:hydroxypropyl acrylate:crotonic acid copolymer having a mole percent ratio of 63:35:2 was prepared by means of the procedure of Example I. Portions of this solution were then blended with varying proportions of a medium viscosity (22 cps. at 4.0% solids) 88% hydrolyzed polyvinyl alcohol whereupon 6 mil, wet thickness, films were cast from each of these solutions and were then air dried for 72 hours at a temperature of 72° F.

Comparable films were also prepared from an aqueous solution of a medium viscosity, 88% hydrolyzed polyvinyl alcohol and from an aqueous solution containing 80 parts, by weight, of this same polyvinyl alcohol which had been plasticized by the addition of 20 parts, by weight, of a 1:1 mixture of glycerol and an organic phosphate type plasticizer.

The tensile strength, in p.s.i., and the percent of elongation of each of these films was then determined using

*Table II.—Copolymer composition*

| Copolymer No. | Mole percent vinyl alcohol | Mole percent hydroxyethyl acrylate | Mole percent hydroxypropyl acrylate | Mole percent hydroxybutyl acrylate | Mole percent crotonic acid | Tensile strength (p.s.i.) | Percent elongation |
|---|---|---|---|---|---|---|---|
| 1 | 50 | 49 | | | 1.0 | 1,180 | 220 |
| 2 | 67.5 | 30 | | | 2.5 | 1,260 | 160 |
| 3 | 77 | 20 | | | 3.0 | 1,320 | 150 |
| 4 | 58 | | 40 | | 2.0 | 850 | 540 |
| 5 | 62 | | 35 | | 3.0 | 1,030 | 320 |
| 6 | 76 | | 20 | | 4.0 | 1,140 | 240 |
| 7 | 80 | | | 15 | 5.0 | 920 | 220 |

The above data demonstrate the excellent strength and flexibility which is characteristic of the films derived from the vinyl alcohol copolymers of our invention.

the Instron Tensile Tester at a crosshead speed of 2 inches per minute. The results of these tests are presented in Table III.

Table III

| Formulation No. | Parts, by wt. of copolymer | Parts, by wt., 88% hydrolyzed medium viscosity polyvinyl alcohol | Parts, by wt., of 1:1 mixture of glycerol and organic phosphate plasticizer | Tensile strength (p.s.i.) | Percent elongation |
|---|---|---|---|---|---|
| 1 | 50 | 50 | | 3,000 | 190 |
| 2 | 40 | 60 | | 4,700 | 140 |
| 3 | 70 | 30 | | 3,900 | 240 |
| 4 | 100 | | | 1,030 | 320 |
| 5 | | 100 | | 3,800 | 55 |
| 6 | | 80 | 20 | 2,000 | 190 |

The above data indicate that the strength and flexibility of the films derived from our copolymer or blends of our copolymer with polyvinyl alcohol is equal or superior to that of films derived from either plasticized or unplasticized polyvinyl alcohol.

Furthermore, upon allowing these films to age for 30 days at room temperature, a repetition of the Instron Tensile Tests disclosed that all of the formulations gave only minor variations in tensile strength and percent elongation with the exception of Formulation #6 wherein the tensile strength increased to 2,400 p.s.i. while the elongation decreased to 100%. Upon continued aging, it was observed that the externally plasticized polyvinyl alcohol film continued to lose its flexibility, eventually approaching that of the unplasticized polyvinyl alcohol film; the latter phenomenon resulting from the migration and evaporation of the plasticizer from the film.

Summarizing, our invention is thus seen to provide novel vinyl alcohol copolymers which are useful in the preparation of soft flexible films and coatings whose characteristics may be readily varied so as to yield water soluble or water insoluble products. Variations may be made in proportions, procedures and materials without departing from the scope of this invention as defined by the following claims.

We claim:

1. A composition consisting of a water-insoluble, linear, random copolymer of from 10 to 90 mol percent of vinyl alcohol and from 90 to 10 mol percent of beta-hydroxyethyl acrylate, said composition being capable of forming a flexible film in the absence of an added plasticizer.

2. A composition consisting of a water-insoluble, linear, random copolymer containing from 10–90 mole percent of vinyl alcohol and 90–10 mole percent of beta-hydroxyalkyl acrylate, the alkyl group of said acrylate having from 2–4 carbon atoms, said composition being capable of forming a flexible film in the absence of an added plasticizer.

3. A composition consisting of an aqueous solution of a linear, random copolymer containing from 10–90 mole percent of vinyl alcohol and 90–10 mole percent of beta-hydroxyalkyl acrylate, the alkyl group of said acrylate having from 2–4 carbon atoms, said composition being capable of forming a flexible film in the absence of an added plasticizer.

4. A film comprising the dried, consolidated residue of the aqueous solution of claim 3.

5. A substrate coated with the dried, consolidated residue of the aqueous solution of claim 3.

6. A film comprising the dried, cross-linked, consolidated residue of a composition consisting of an aqueous solution of a linear, random copolymer containing from 10–90 mole percent of vinyl alcohol and 90–10 mole percent of beta-hydroxyethyl acrylate, said film being flexible in the absence of an added plasticizer.

7. A composition consisting of a homogeneous, water-insoluble, linear, random terpolymer containing from 10–90 mole percent of vinyl alcohol, 90–10 mole percent of at least one beta-hydroxyalkyl acrylate ester selected from the group consisting of hydroxyethyl acrylate, hydroxypropyl acrylate and hydroxybutyl acrylate and up to 5 mole percent of one other monomer selected from the group consisting of crotonic acid, alkyl esters of crotonic acid having alkyl groups containing from 1 to 8 carbon atoms and beta-hydroxy alkyl esters of crotonic acid having alkyl groups of from 2 to 4 carbon atoms, said composition being capable of forming a flexible film in the absence of an added plasticizer.

8. An aqueous solution of a composition consisting of a homogeneous, linear, random terpolymer containing from 10 to 90 mol percent of vinyl alcohol, 90 to 10 mol percent of at least one beta-hydroxy alkyl acrylate ester selected from the group consisting of hydroxyethyl acrylate, hydroxypropyl acrylate and hydroxybutyl acrylate and up to 5 mol percent of one another monomer selected from the group consisting of crotonic acid, alkyl esters of crotonic acid having alkyl groups containing from 1 to 8 carbon atoms and beta-hydroxy alkyl esters of crotonic acid having alkyl groups of from 2 to 4 carbon atoms, said composition being capable of forming a flexible film in the absence of an added plasticizer.

9. A film comprising the dried, consolidated residue of the aqueous solution of claim 7.

10. A substrate coated with the dried, consolidated residue of the aqueous solution of claim 7.

References Cited by the Examiner

UNITED STATES PATENTS

| 2,484,487 | 10/49 | Caldwell | 260—486 |
| 3,005,809 | 10/61 | Lowell et al. | 260—85.7 |
| 3,069,376 | 12/62 | Cline | 260—29.6 |
| 3,083,172 | 3/63 | Scott et al. | 260—29.6 |

JOSEPH L. SCHOFER, *Primary Examiner.*